United States Patent [19]
McEvoy et al.

[11] Patent Number: 6,029,424
[45] Date of Patent: Feb. 29, 2000

[54] HIGH-SPEED EGG PROCESSING SYSTEM AND METHOD

[75] Inventors: John Christie McEvoy, Canton; James M. Nield, Northville; George Nelson Bliss, Bloomfield Hills, all of Mich.

[73] Assignee: Diamond Automations, Inc., Farmington Hills, Mich.

[21] Appl. No.: 09/008,034

[22] Filed: Jan. 16, 1998

[51] Int. Cl.[7] .................................................... B65B 21/06
[52] U.S. Cl. .............................. 53/443; 53/448; 53/475; 53/154; 53/543; 209/510; 198/448
[58] Field of Search ........................... 53/154, 147, 543, 53/531, 443, 448, 475; 209/510, 512; 198/443, 445, 447–452

[56] References Cited

U.S. PATENT DOCUMENTS

| | | |
|---|---|---|
| 2,731,146 | 1/1956 | Page . |
| 4,355,936 | 10/1982 | Thomas et al. . |
| 4,487,321 | 12/1984 | Bliss . |
| 4,488,637 | 12/1984 | Loeffler . |
| 4,505,373 | 3/1985 | Thomas . |
| 4,519,494 | 5/1985 | McEvoy et al. . |
| 4,519,505 | 5/1985 | Thomas . |
| 4,569,444 | 2/1986 | McEvoy et al. . |
| 5,167,317 | 12/1992 | van der Schoot et al. . |

FOREIGN PATENT DOCUMENTS 2 005 211   4/1979   United Kingdom .

*Primary Examiner*—Ed Tolan
*Attorney, Agent, or Firm*—Kenyon & Kenyon

[57] ABSTRACT

An apparatus for conveying, cleaning, drying, oiling, candling, grading and packing eggs and high speeds. A main conveyor assembly, which includes two or more conveyors, transfers eggs continuously in spaced-apart, aligned relationship to transfer at which eggs are packaged according to their previously-determined individual physical characteristics, such as weight, cracks, dirt, etc. The conveyors can run in the same direction, or may run in opposite directions. The transfers accommodate the at least two conveyors, and include a section which gathers ejected eggs and may convey them to a packing station in a manner which prevents egg collisions. The eject mechanism for ejecting eggs from the conveyors ensures proper distribution of the eggs across a transfer so as to prevent egg collisions and to ensure that the packers are filled equally across their widths.

39 Claims, 14 Drawing Sheets

| 27R | 24R | 21R | 18R | 15R | 12R | 9R | 6R | 3R |
|---|---|---|---|---|---|---|---|---|
| 26R | 23R | 20R | 17R | 14R | 11R | 8R | 5R | 2R |
| 25R | 22R | 19R | 16R | 13R | 10R | 7R | 4R | 1R |

21A →

| 27F | 24F | 21F | 18F | 15F | 12F | 9F | 6F | 3F |
|---|---|---|---|---|---|---|---|---|
| 26F | 23F | 20F | 17F | 14F | 11F | 8F | 5F | 2F |
| 25F | 22F | 19F | 16F | 13F | 10F | 7F | 4F | 1F |

| | 1 | 2 | 3 | 4 | 5 | 6 | 7 | 8 | 9 | 10 | 11 | 12 |
|---|---|---|---|---|---|---|---|---|---|---|---|---|
| | 1F | | | | | | | | | | | |
| | | 1R | | | | | | | | | | |
| | 7F | | 2F | | | | | | | | | |
| | | 7R | | 2R | | | | | | | | |
| | 13F | | 8F | | 3F | | | | | | | |
| | | 13R | | 8R | | 3R | | | | | | |
| | 19F | | 14F | | 9F | | | | | | | |
| | | 19R | | 14R | | 9R | 4F | | | | | |
| | 25F | | 20F | | 15F | | | 4R | | | | |
| | | 25R | | 20R | | 15R | 10F | | 5F | | | |
| | 31F | | 26F | | 21F | | | 10R | | 5R | | |
| | | 31R | | 26R | | 21R | 16F | | 11F | | 6F | |
| | 37F | | 32F | | 27F | | | 16R | | 11R | | 6R |
| | | 37R | | 32R | | 27R | 22F | | 17F | | 12F | |
| | 43F | | 38F | | 33F | | | 22R | | 17R | | 12R |
| | | 43R | | 38R | | 33R | 28F | | 23F | | 18F | |
| | 49F | | 44F | | 39F | | | 28R | | 23R | | 18R |

FIG. 8

HIGH-SPEED EGG PROCESSING SYSTEM AND METHOD

BACKGROUND OF THE INVENTION

1. Field of the Invention

This invention relates generally to an egg processing system and method in which eggs are graded and classified and subsequently separated, and possibly packaged, according to their individual physical characteristics, such as weight, cracks, blood, dirt, etc.

2. Description of the Prior Art

U.S. Pat. Nos. 4,569,444; 4,519,494; 4,519,505; 4,505,373; 4,488,637; 4,355,936; and 4,487,321 all show portions of an egg processing system and method which has greatly increased the ability to ensure gentle and reliable loading, washing, drying, candling, grading, and packing of eggs of a variety of sizes and conditions at high speeds.

U.S. Pat. No. 5,167,317 to van der Schoot shows transfers for eggs ejected from a main conveyor, which transfers are adaptations of the transfers shown in U.S. Pat. No. 4,519,494.

It is known in the art, for example in devices sold by Diamond Automation, Inc., to provide a "splitting" conveyor which allows objects, such as eggs, to be conveyed from a first spool conveyor to two parallel spool conveyors of widths narrower than that of the first spool conveyor. Such a conveyor includes rows of cups on a conveyor including rods upon which the cups may slide. The cups thereafter slide in one of two angled directions, guided by angled guides. In this manner, an, e.g., 12-wide spool conveyor with eggs thereon may "split" those rows, i.e., direct the eggs into two, e.g., 6-wide spool conveyors which are spaced from one another.

SUMMARY OF THE INVENTION

The prior art egg grading systems have been sufficient, as technology has improved, to achieve remarkably gentle and reliable egg processing at high speeds. However, there is a continuing need for egg processing systems which allow the same level of reliability and gentleness as are achieved by prior art egg processing systems, but which operate at even higher speeds (i.e., an even greater cases-per-hour processing capacity).

The present invention satisfies the need for a gentle and reliable egg processing system and method which operates at speeds which have not yet been achieved using prior art technology. In one embodiment of the present invention, two sets of washing, drying, candling and weighing stations are arranged parallel to one another at one end of the main conveyor assembly, with each set of stations feeding to one of two conveyors in a main conveyor assembly. The conveyors are arranged side-by-side and parallel to one another, and the transfer sections between the stations and the conveyors may be set back from one another so as to accommodate the two side-by-side conveyors. The conveyors convey eggs to one of a plurality of packing stations, at which eggs are packaged or otherwise handled according to characteristics of the eggs (weight, cracks, dirt, etc.) which are determined by the system before the eggs are transferred to the conveyors.

Each packing station can include one or more transfers, which receive eggs and may direct them to a common egg packer. A consolidation feature of the transfer ensures that all eggs ejected at a packing station, from either conveyor, are fed into the packer for that packing station. The apparatuses for ejecting eggs from the conveyor are controlled so as to ensure that eggs are ejected in a manner so as to not interfere with other eggs ejected at the same packing station, and to ensure that the packer at that packing station receives eggs across its entire width. This is accomplished, in one embodiment, using alternating rows on a transfer feeding the packer, wherein, e.g., "odd" rows receive eggs from the first conveyor, while, e.g., "even" rows receive eggs from the second conveyor. Adjacent odd and even rows thereafter merge into a single row. Ejecting patterns may be used to ensure equal distribution of eggs across the packer without interference between eggs. As a result of this arrangement, an equal distribution across each packer may be ensured, even if the conveyors are running at different speeds, and/or receive different numbers of eggs of a particular grade. Other contemplated embodiments use different configurations of the transfers, such that the first and second conveyors eject in different patterns into the rows on the transfers, which rows thereafter merge.

In a second embodiment of the present invention, one set of washing, drying, candling and weighing stations is arranged at one end of the main conveyor assembly, and a second set of washing, drying, candling and weighing stations is arranged the other end of the main conveyor assembly. The first set of stations feed to a first conveyor running in a first direction (toward the second set of stations) and the second set of stations feed to a second conveyor running in a second direction (toward the first set of stations).

In a third embodiment of the invention, a single set of washing, drying, candling and weighing stations (which preferably are of a larger, wider and/or higher speed than those stations of the first and second embodiments) feed eggs to a transfer which feeds the eggs to each of two conveyors. In all other respects, the remainder of the third embodiment is similar to the first embodiment.

Preferably, the conveyors of the present invention are synchronized to run at the same speed; however, the present invention contemplates conveyors running at different speeds. Furthermore, although the preferred embodiment uses two or more conveyors, the present invention may be adapted to be used with a single conveyor having four or more rows of eggs, or with any number of conveyors.

The present invention may also include various embodiments of transfer configurations at the packing station, which use appropriate eject patterns to ensure equal distribution and some of which may include staggering or off-setting of the transfers in order to reduce the overall length of the system.

BRIEF DESCRIPTION OF THE DRAWINGS

FIG. 7 is a schematic illustration of a sequence in which eggs may be ejected into the transfer from the egg conveyors in the embodiment of FIG. 6, where the conveyors are two rows wide;

FIG. 8 is a schematic illustration of a sequence in which eggs may be ejected into the transfer from the egg conveyors in the embodiment of FIG. 6, where the conveyors are three rows wide;

DETAILED DESCRIPTION OF THE INVENTION

Figure 1:
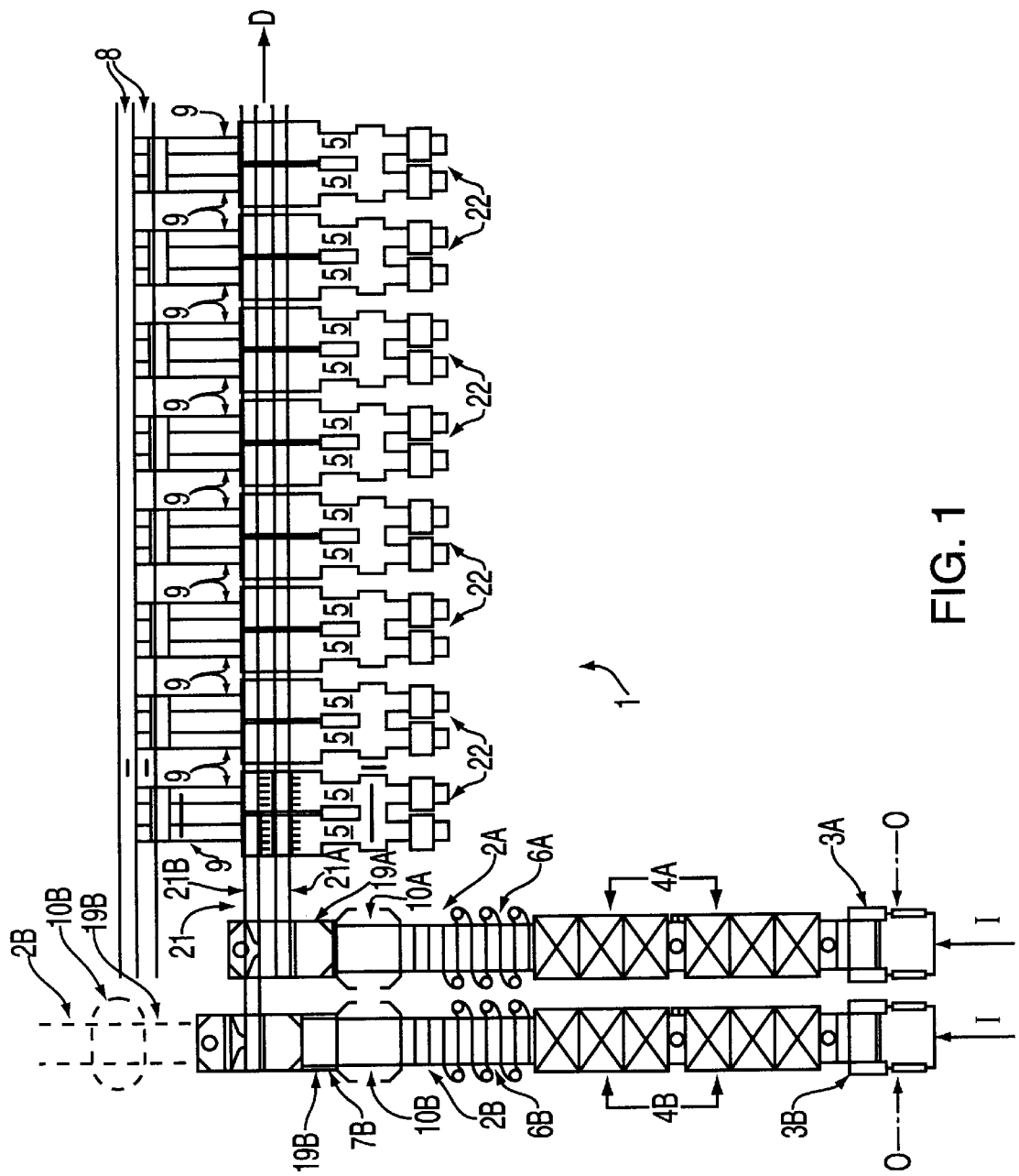
FIG. 1 is a top plan view of a first embodiment of an improved egg processing system constructed according to the present invention.

Referring now to the drawings, and in particular to FIG. 1, there is shown a first embodiment of an egg processing system 1 of the present invention. Eggs are transferred on to the egg processing system 1 in either an in-line manner (indicated by arrows I) or an offline manner (indicated by arrows O). As is known in the art, inline transfer I may be accomplished using any known conveying system which conveys eggs from a facility including hens directly into the egg processing system 1 (which may include an accumulator), and offline transfer O may be accomplished using any known system for loading a mass of eggs into the egg processing system 1, e.g., loaders and/or preloaders. If a loader is used, it may be of the type described in U.S. Pat. No. 4,355,936; the disclosure of that patent is incorporated by reference.

The eggs are conveyed on spool bar conveyors 12A and 12B from stations 3A and 3B to egg washers 4A and 4B which form washing stations at which the eggs are washed. The eggs are then conveyed to egg dryers 6A and 6B which form drying stations at which the washed eggs are dried. Stations 2A and 2B may be included in the egg processing system 1 in order to allow for egg oilers, crack detectors, or any other known egg processing step known in the art. The eggs may then be conveyed to candlers 10A and 10B forming a candling station at which defects are visually detected by an operator who stands on a platform on either side of the candlers 10A or 10B. The eggs may be conveyed through candlers 10A and 10B by movable spool bar conveyors 12A and 12B, respectively (see FIG. 4) to egg weighing stations 19A and 19B at which the eggs are individually weighed. A conveyor extension 7B is interposed between the candler 10B and the weighing station 19B in order to accommodate the fact that the second conveyor 21B is set back from the first conveyor 21A.

After weighing, the eggs are transferred, by a transfer mechanism, to a conveyor assembly 21 which includes two conveyors 21A and 21B. In the embodiment of FIG. 1, the conveyors 21A and 21B both travel in the same direction D. It is to be understood that in the embodiment of FIG. 1, the movement of the transfer mechanisms and the conveyors 21A, 21B are preferably running at the same speed. However, the present invention could include an arrangement wherein the conveyors 21A and 21B operate at different speeds. Such an arrangement might be useful in a situation where one conveyor 21A or 21B is used to handle eggs which are likely to be dirtier, have more cracks, etc. (because of conditions in the location where they were produced), and therefore those eggs may need more time in the washing, drying, or candling stations. This arrangement would allow the associated conveyor 21A or 21B to run at a speed slower than the other conveyor 21A or 21B.

On each conveyor 21A and 21B, the eggs are conveyed in spaced-apart, adjacent rows (two, three, four, or even more rows) to a plurality of egg packers 22 at which eggs which have been graded and classified are separated according to their individual physical characteristics. Cartons into which the eggs are packed are conveyed from the packers 22 on conveyors 9, which cartons are packed into cases and conveyed on conveyors 8 to a cooler.

In the embodiment of FIG. 1, an alternative arrangement is shown in dashed lines wherein the stations 19B, 10B, 2B, 6B, 4B and 3B are parallel to, but on an opposite side of conveyor assembly 21, stations 19A, 10A, 2A, 6A, 4A and 3A. In all other respects, however, this alternative arrangement is the same to that of the embodiment of FIG. 1.

Figure 2:
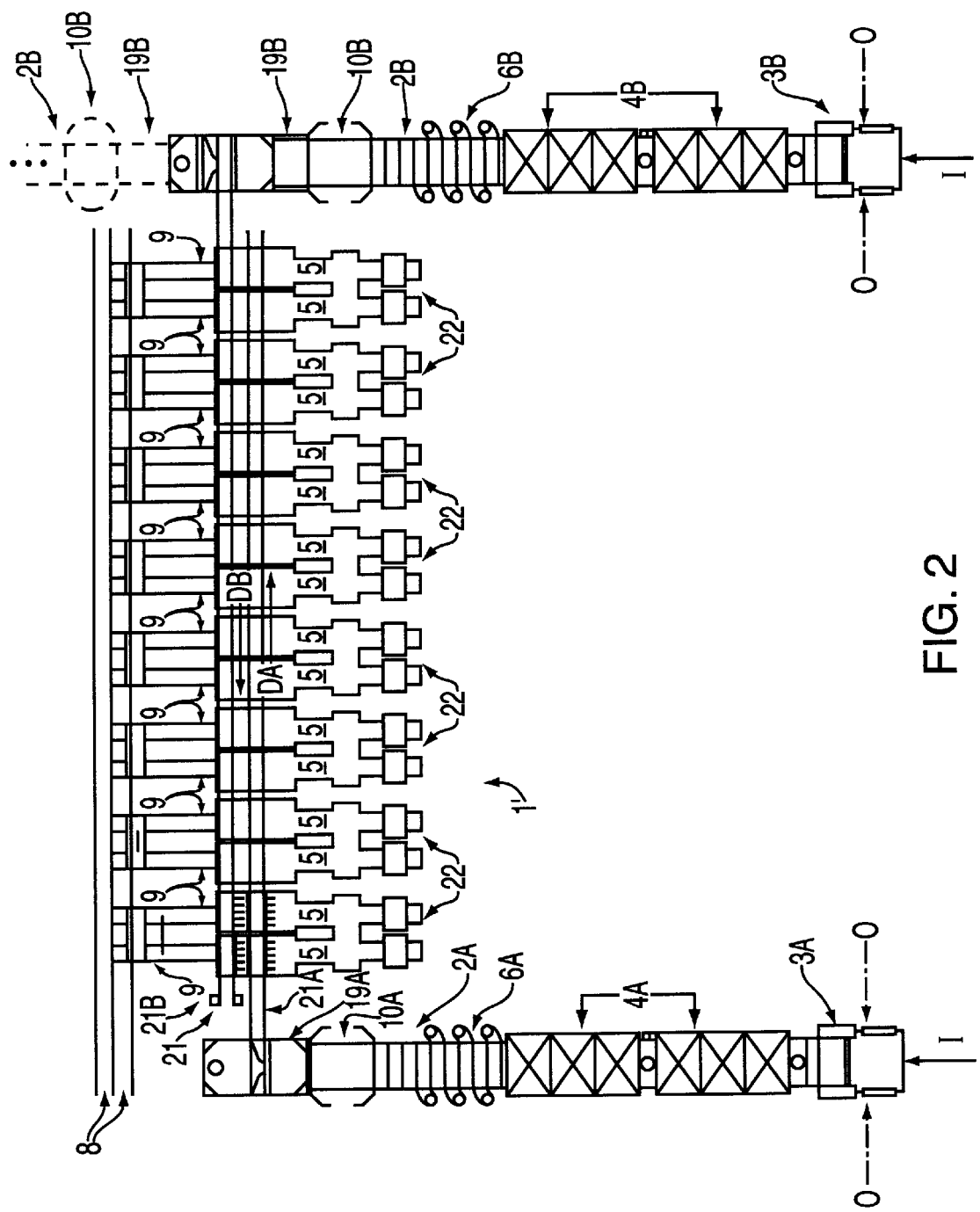
FIG. 2 is a top plan view of a second embodiment of an improved egg processing system constructed according to the present invention.

FIG. 2 shows a second embodiment of the egg processing system 1' of the present invention. The embodiment of FIG. 2 is similar to the embodiment of FIG. 1, except that the stations 19B, 10B, 2B, 6B, 4B and 3B are located at an end of conveyor assembly 21 opposite the end of conveyor assembly 21 where the stations 19A, 10A, 2A, 6A, 4A and 3A are located. In the embodiment of FIG. 2, the first conveyor 21A moves in a first direction DA, while the second conveyor 21B moves in a second direction DB which is opposite the first direction DA.

Also in the embodiment of FIG. 2, an alternative arrangement is shown in dashed lines wherein the stations 19B, 10B, 2B, 6B, 4B and 3B are an opposite side of conveyor assembly 21 from stations 19A, 10A, 2A, 6A, 4A and 3A. In all other respects, however, this alternative arrangement is the same to that of the embodiment of FIG. 2.

Figure 3:
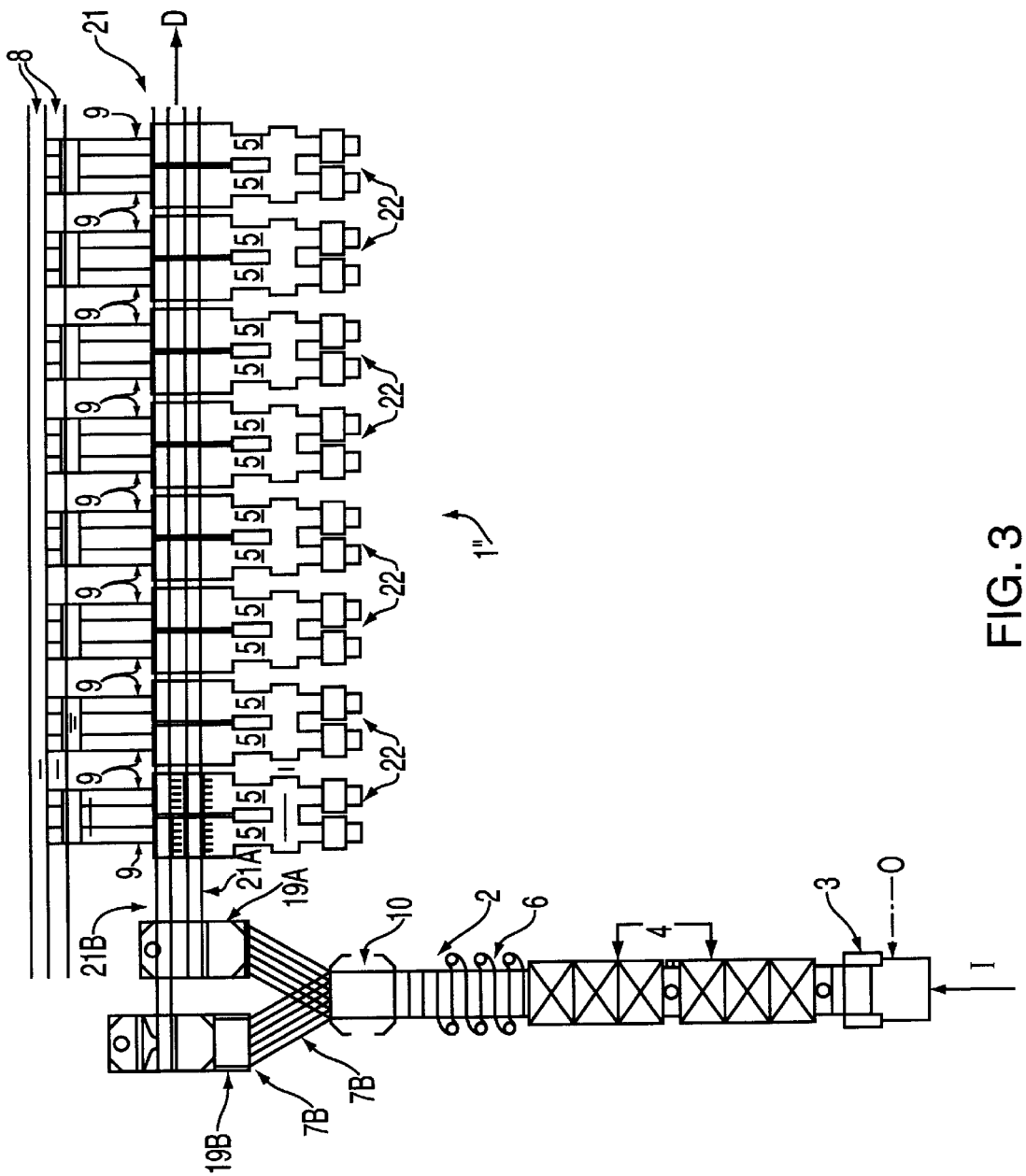
FIG. 3 is a top plan view of a third embodiment of an improved egg processing system constructed according to the present invention.

FIG. 3 shows an alternative embodiment of the egg processing system 1" of the present invention. In the embodiment of FIG. 3, a single series of stations—candling station 10, oiling/crack detecting/etc. station 2, drying station 6, washing station 4 and conveying station 3 are used to feed both conveyors 21A, 21B. It may be appreciated by those skilled in the art that the stations 10, 2, 6, 4 and 3 as used in the embodiment of FIG. 3 will necessarily need to be of higher capacity and/or higher speed than the stations 10A, 2A, 6A, 4A, 3A, 10B, 2B, 6B, 4B and 3B used in the embodiments of FIGS. 1 and 2. In the embodiment of FIG. 3, after eggs are conveyed from the candling station 10, they are transferred onto a dividing station 7—which may be a "splitting" conveyor known in the art—which divides the eggs coming from candling station 10 into two conveyed streams. A first stream of eggs is conveyed to a weighing station 19A, and a second stream of eggs is conveyed first to a conveyor extension 7B (interposed between dividing conveyor 7 and the weighing station 19B in order to accommodate the fact that the second conveyor 21B is set back from the first conveyor 21A), and thereafter to a weighing station 19B. Thereafter, the egg processing system 1" of FIG. 3 is identical to the egg processing system 1 of FIG. 1. It is to be understood that the embodiment of FIG. 3 could be configured so that a single weighing station is used, which would be located upstream of the dividing station 7. Such a configuration would reduce the number of weighing scales necessary.

Figure 3A:
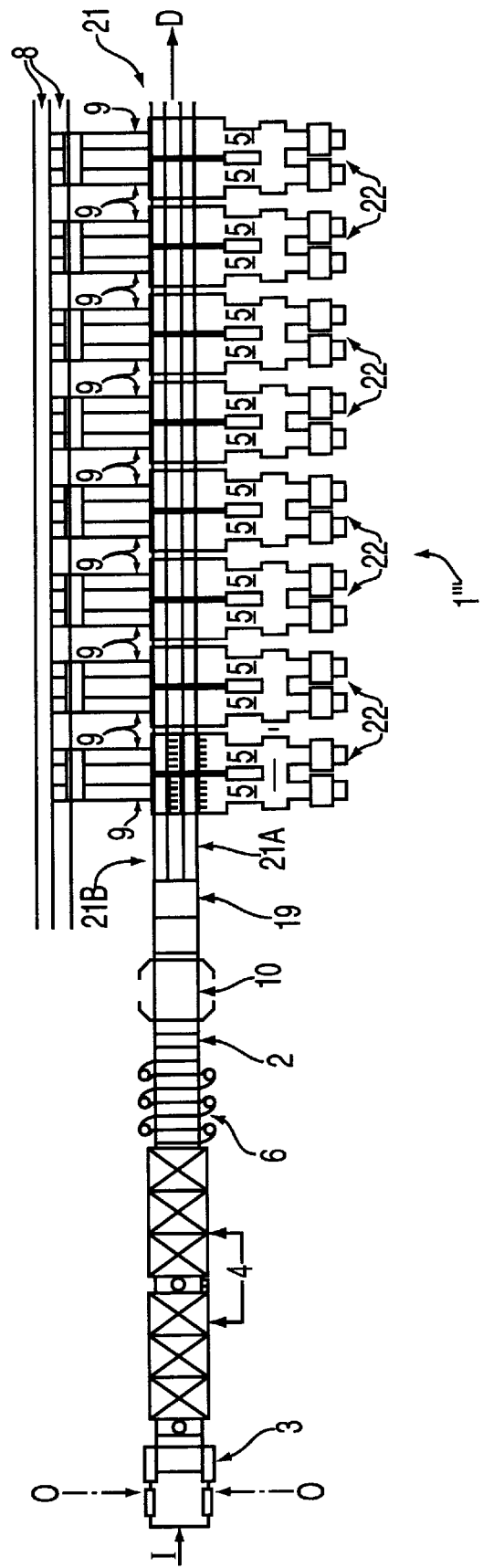
FIG. 3a is a top plan view of a fourth embodiment of an improved egg processing system constructed according to the present invention.

FIG. 3a is an alternative embodiment of the system 1" of the present invention, which uses a single series of stations—weighing station 19, candling station 10, oiling/ crack detecting/etc. station 2, drying station 6, washing station 4 and conveying station 3 are used to feed both conveyors 21A, 21B. In the embodiment of FIG. 3a, these stations are located inline with the conveyors 21A, 21B, and a suitable transfer mechanism is provided to transfer eggs onto the conveyors 21A, 21B after weighing at weighing station 19.

Figure 4:
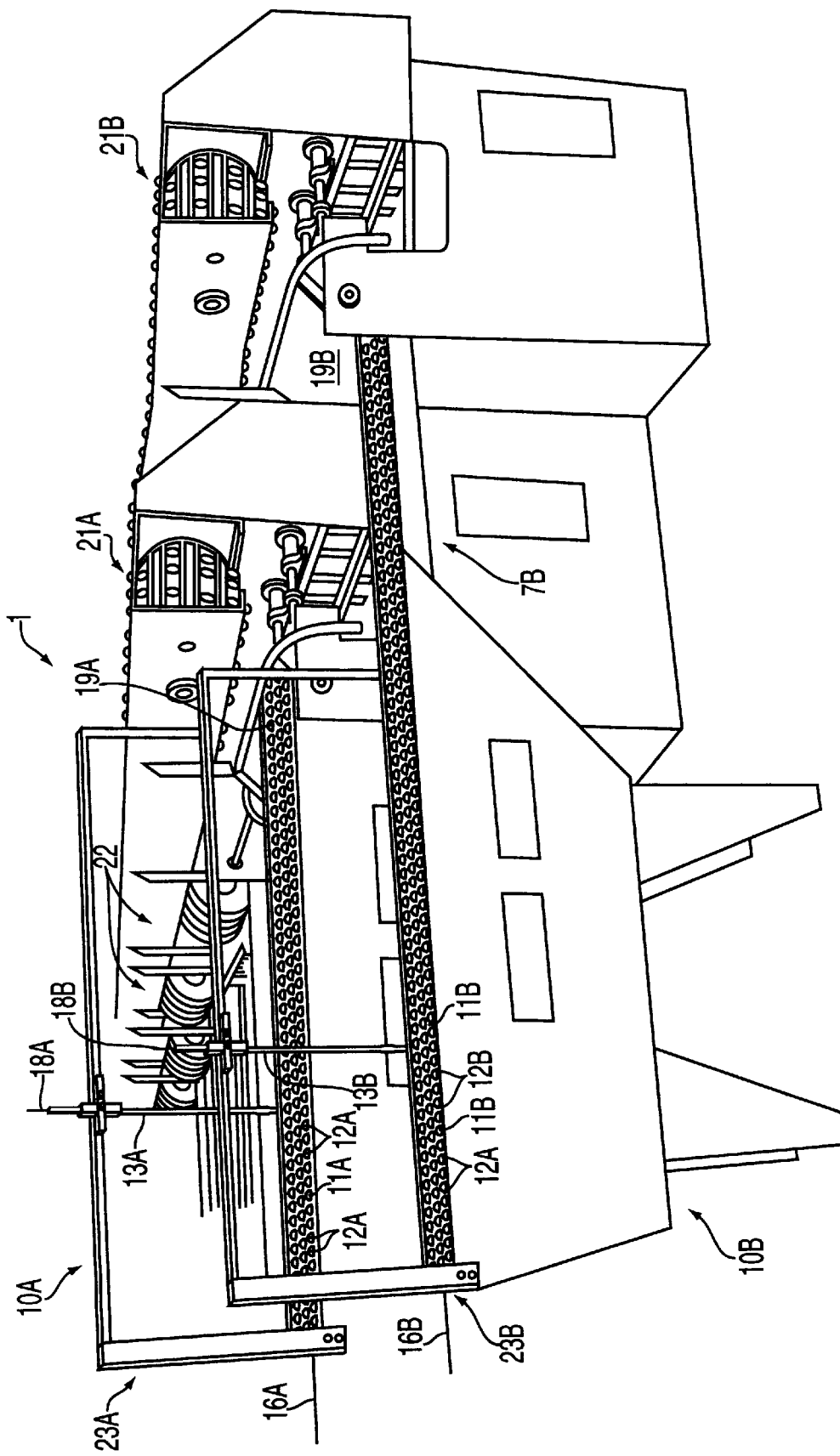
FIG. 4 is a perspective view of a portion of the egg processing system illustrated in FIG. 1.

Referring now to FIG. 4, the egg candlers 10A, 10B and the conveyors 21A, 21B of the egg processing system 1 of FIG. 1 are shown. In the candlers 10A, 10B, masses of eggs 11A and 11B, including randomly dispersed eggs having defects such as blood spots, dirt stains, rough spots, shell cracks and the like, are continuously conveyed by a spool bar conveyor including a plurality of spool bars 12A, 12B over a high-intensity light source to enable the visual detection of such defects by an operator standing adjacent to one of the conveyors. The movable spool bars 12A, 12B, can include a plurality of concave cylinders rotatably mounted on spaced-apart, parallel spools driven at their ends in conveyor-fashion by parallel chain drives. The eggs are disposed between the spools, as known in the art, and the spools continuously convey eggs 11A, 11B through candlers 10A, 10B, respectively in spaced-apart, aligned relationship, i.e., in aligned columns and rows over the high-intensity light source. In the illustrated embodiment of the invention, the eggs may be aligned in 12 parallel longitudinal columns on the spool bars for passage through the candlers 10A, 10B and over the high-intensity light source to enable visual detection of defects. However, it is to be understood that any number of columns of eggs could be conveyed on spool conveyor, depending on the speed and/or capacity requirements of the system, or, e.g., whether on (FIG. 3) or multiple (FIGS. 1 and 2) candlers are used.

An elongated movable pointer or rod 13A, 13B may be disposed vertically above spool bars 12A, 12B, respectively, and are pivotably mounted at their upper end so as to be movable over a selected area or plane of the candler 10A or 10B above the spool bars 12A, 12B in mutually orthogonal directions, approximately parallel to the longitudinal axes 16A, 16B of the spool bar conveyors and perpendicular to longitudinal axes 16A, 16B, i.e., in directions approximately parallel to the columns and rows of eggs 11A, 11B on spool bars 12A, 12B. The vertical lower ends of pointers 13A, 13B are disposed adjacent spool bars 12A, 12B and are axially movable along their longitudinal axes 18A, 18B so that lower ends are movable into and out of engagement with the shells of eggs disposed in the plurality of locations within the selected area of the candling systems on spool bars 12A, 12B over which pointers 13A, 13B are movable. The eggs, including defective eggs identified by the operator, are conveyed through the candlers 10A, 10B to egg weighing stations 19A, 19B, respectively (see also FIG. 1) which includes scales for weighing the eggs, and then are transferred by an egg transfer system (described below) to egg conveyors 21A, 21B, each of which convey the eggs in adjacent pairs (or alternatively, in three, four or more rows) to a plurality of egg packing stations 22 where the eggs are separated and packaged in cartons according to their weight and the type of defect detected, if any.

Pointers 13A, 13B are pivotably mounted in frames 23A, 23B, respectively. In operation, eggs 11A, 11B are continuously conveyed on spool bars 12A, 12B beneath rods 13A, 13B over the light source of candlers 10A, 10B and are visually inspected by an operator for defects. If defective eggs are detected by the operator, pointers 13A, 13B are first pivoted to position over each defective egg and then is moved downwardly, along the longitudinal axis of the pointer, toward the defective egg until the egg is engaged by the end of the rod 13A, 13B. Further details of the construction and operation of the candlers 10A, 10B are contained in U.S. Pat. No. 4,487,321, the disclosure of which is incorporated herein by reference. It is also to be understood that any known candling system, not necessarily the candling system in U.S. Pat. No. 4,487,321, could be used in the egg processing system of the present invention.

As can be seen in both FIGS. 1 and 4, the candler 10A and weighing station 19A feed eggs to conveyor 21A, and the candler 10B feeds eggs to the conveyor extension 7B, which conveyor extension 7B feeds eggs to weighing station 19B, which in turn feeds egg to conveyor 21B.

The mechanism for transferring eggs from the weighing stations 19A, 19B to the conveyors 21A, 21B can be of any known type, and in particular can be of the type shown in U.S. Pat. Nos. 4,569,444, 4,519,505 or 4,505,373, the subject matter of those patents being incorporated herein by reference.

Figure 5:
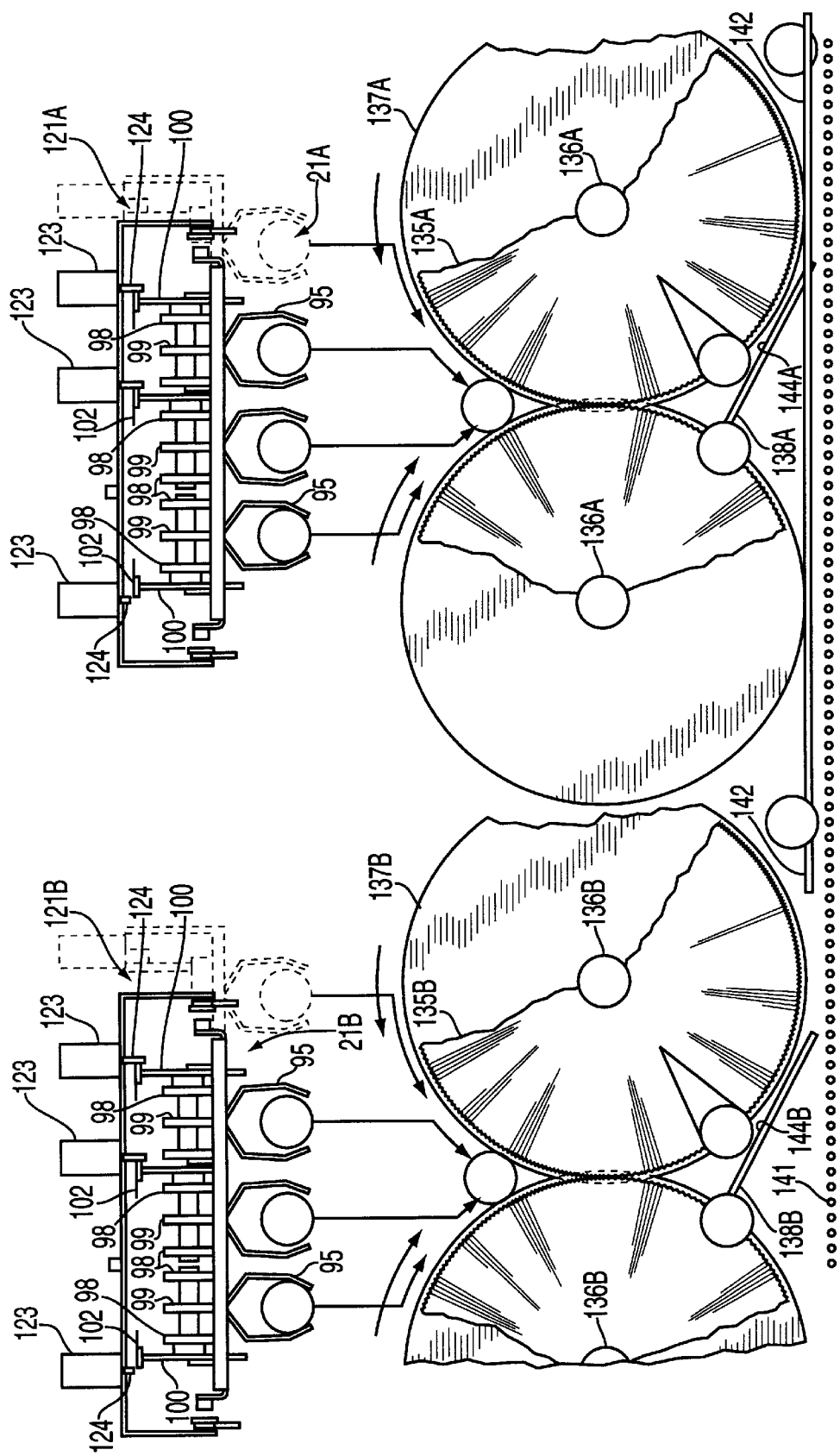
FIG. 5 is a cross-sectional view of a transfer of the present invention.

FIG. 5 illustrates transfers which may be used in the present invention. Although FIG. 5 illustrates the conveyors 21A, 21B as having three rows of eggs, it is to be understood that each conveyor 21A, 21B can include two, three or four rows (or possibly even more rows) of egg prongs for conveying eggs to the appropriate packer 22. For an embodiment having two rows of eggs, the configuration of the rows on the conveyors 21A, 21B relative to the brushes would be as illustrated in U.S. Pat. No. 4,569,444 (i.e., FIG. 24); for an embodiment having four rows of eggs, an additional row of eggs on the conveyors 21A, 21B would be added in front of the frontmost rows shown on conveyors 21A, 21B in FIG. 5 (as shown in dashed lines). The structure and operation of the egg prongs on conveyors 21A, 21B can be of the type described in U.S. Pat. Nos. 4,569,444 and 4,488,637, the subject matter of which is incorporated herein by reference. Additionally, each of the conveyors 21A, 21B may include an apparatus which allows the point at which eggs are ejected to be adjusted at different speeds of the conveyors 21A, 21B. Apparatuses for accomplishing this result are disclosed in U.S. Pat. No. 4,569,444, the disclosure of that patent being incorporated by reference.

Figure 6:
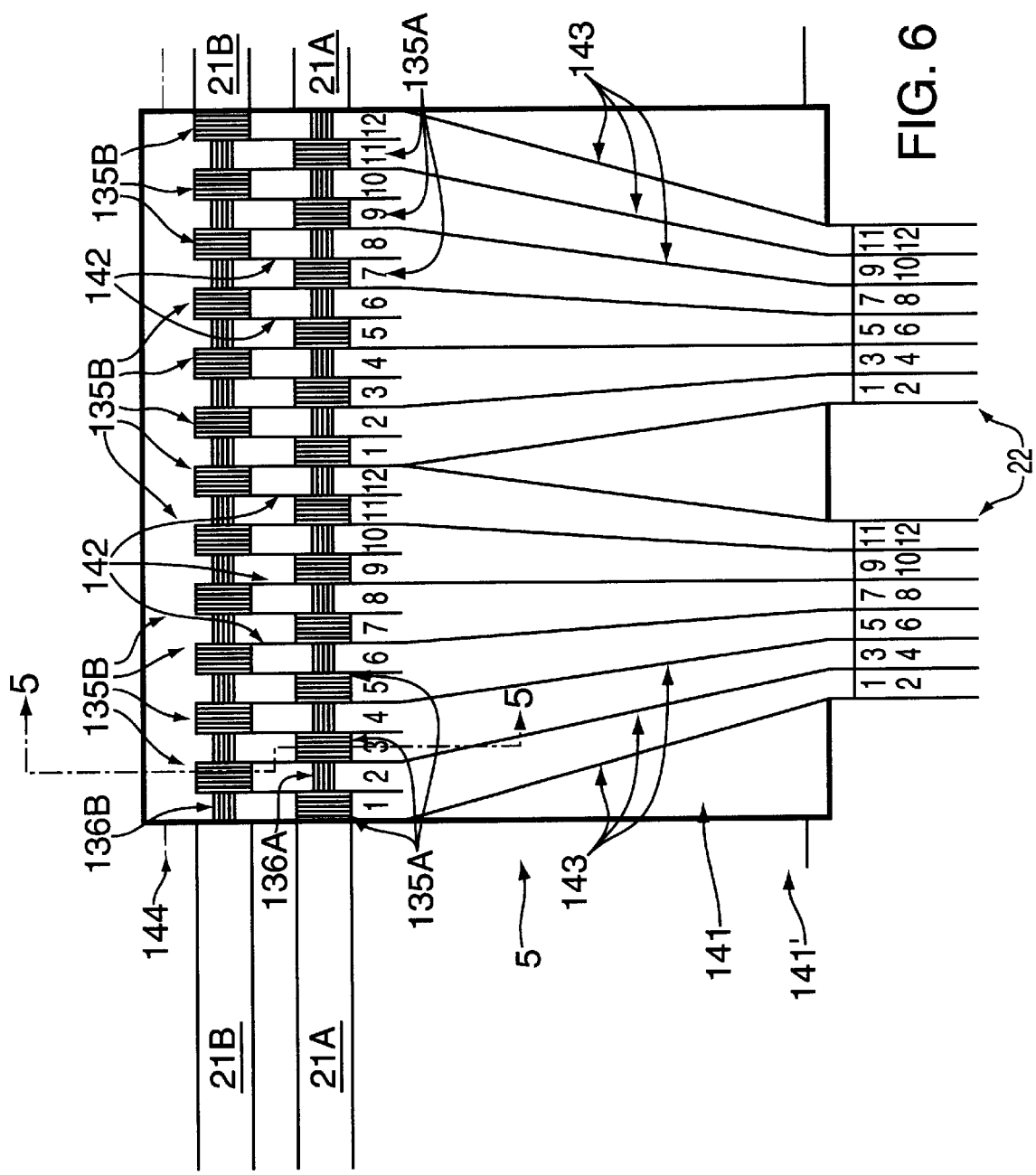
FIG. 6 is a schematic, partially cross-sectional view of a transfer of the present invention.

FIG. 5 shows a partial cross-sectional view of transfers feeding to one packer 22 of the egg processing system 1, 1', 1" of the present invention, through the line V—V in FIG. 6. Movable frames 121A, 121B are disposed over pairs of rotatable resilient cylinders 135A, 135B, respectively which are coaxially mounted on spaced drive shafts 136A, 136B. In the embodiment of the invention illustrated in FIG. 5, the cylinders 135A, 135B may be cylindrical brushes preferably fabricated with nylon bristles. A plurality of rotatable disks 137A, 137B may be mounted on shafts 136A, 136B in order to define a plurality of channels or rows in the cylinders 135A, 135B for receiving eggs from the prongs 95, which form conveying and ejecting elements, on the conveyors 21A, 21B. The cylinders 135A, 135B are disposed vertically below movable frames 121A, 121B, respectively, and cylinders 135A, 135B have one peripheral edge engaging and in slight interference with a peripheral edge of the adjacent cylinder, 135A, 135B, respectively. A peripheral edge of each forwardmost cylinder is furthermore disposed generally adjacent a support member 138A or 138B, which may be formed of a sheet of plastic, such as Mylar™, stretched over and mounted on a frame extending axially along substantially the entire length of the cylinders 135A or 135B. A conveyor belt 141, which may be formed of a continuous belt conveyor or wire conveyor, is disposed below all of the cylinders 135A, 135B for conveying eggs received therefrom to an egg packer 22 (not shown in FIG. 5) which packs the eggs in cartons or trays as desired. Conveyor belt 141 is divided into a plurality of channels or rows aligned with channels or rows formed in the cylinders 135A, 135B by a plurality of elongated stationary guide members 142 which, in the illustrated embodiment of the invention, are disposed over the conveyor belt 141 in close proximity thereto and may have an inverted, V-shaped profile (i.e., are upwardly convex). Conveyor belt 141 may be driven by rotating rods or spindles 141', 141" (FIG. 6). A suitable drive, such as an electric motor, may be coupled to shafts 136A, 136B for rotating the cylinders 135A, 135B, respectively so that the peripheral edges thereof rotate in opposite directions inwardly towards each other and away from prongs 95. As can be readily seen in FIG. 5, support members 138A, 138B are upwardly inclined toward the rearwardmost shafts 136A, 136B with respect to the direction of movement of conveyor 141 and their uppermost surfaces 144A, 144B are disposed beneath and slightly spaced from the peripheral edges of cylinders 135A, 135B. This surface may also be curved in a direction substantially in conformance with that of the forwardmost one of the cylinders 135A, 135B in order to maintain contact between cylinders 135A, 135B and the eggs guided along member 138A, 138B onto conveyor 141. The speed of the transfers under each conveyor 21A, 21B may be independent from one another.

Figure 12:
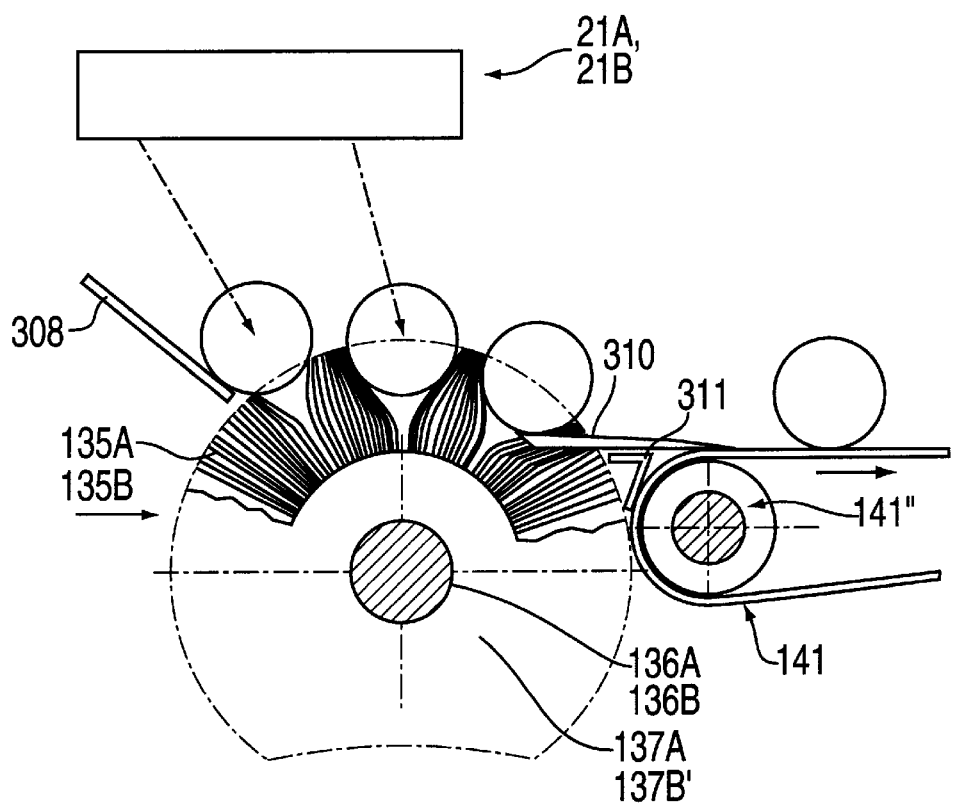
FIG. 12 is a schematic, partially cross-sectional view of a second embodiment of a transfer of the present invention.
Figure 13:
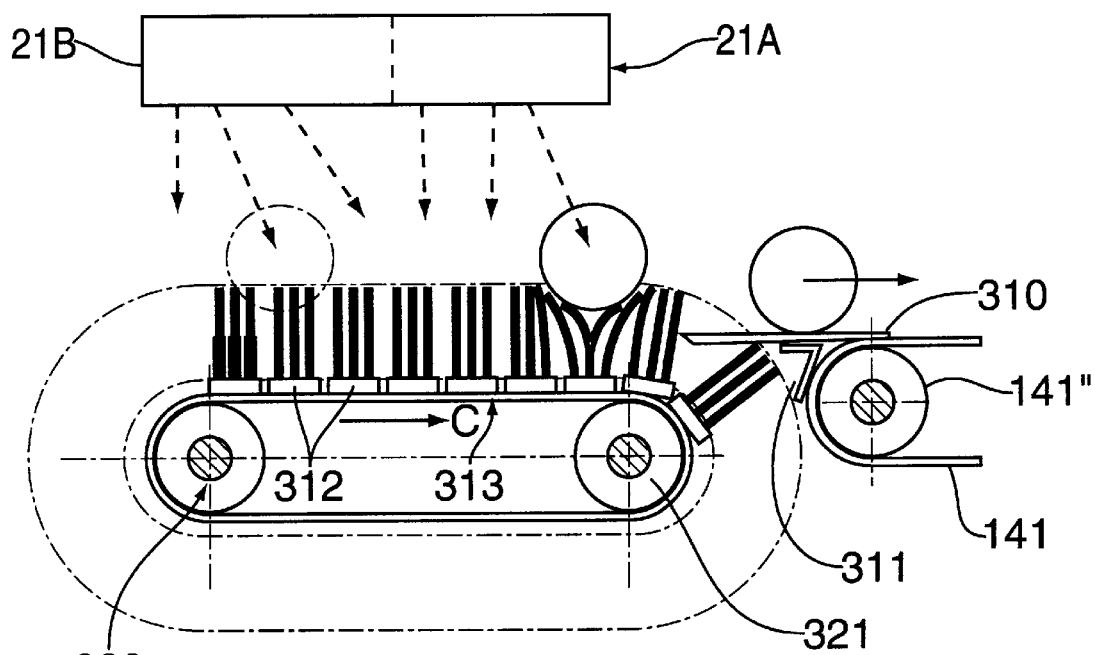
FIG. 13 is a schematic, partially cross-sectional view of a third embodiment of a transfer of the present invention.
Figure 14:
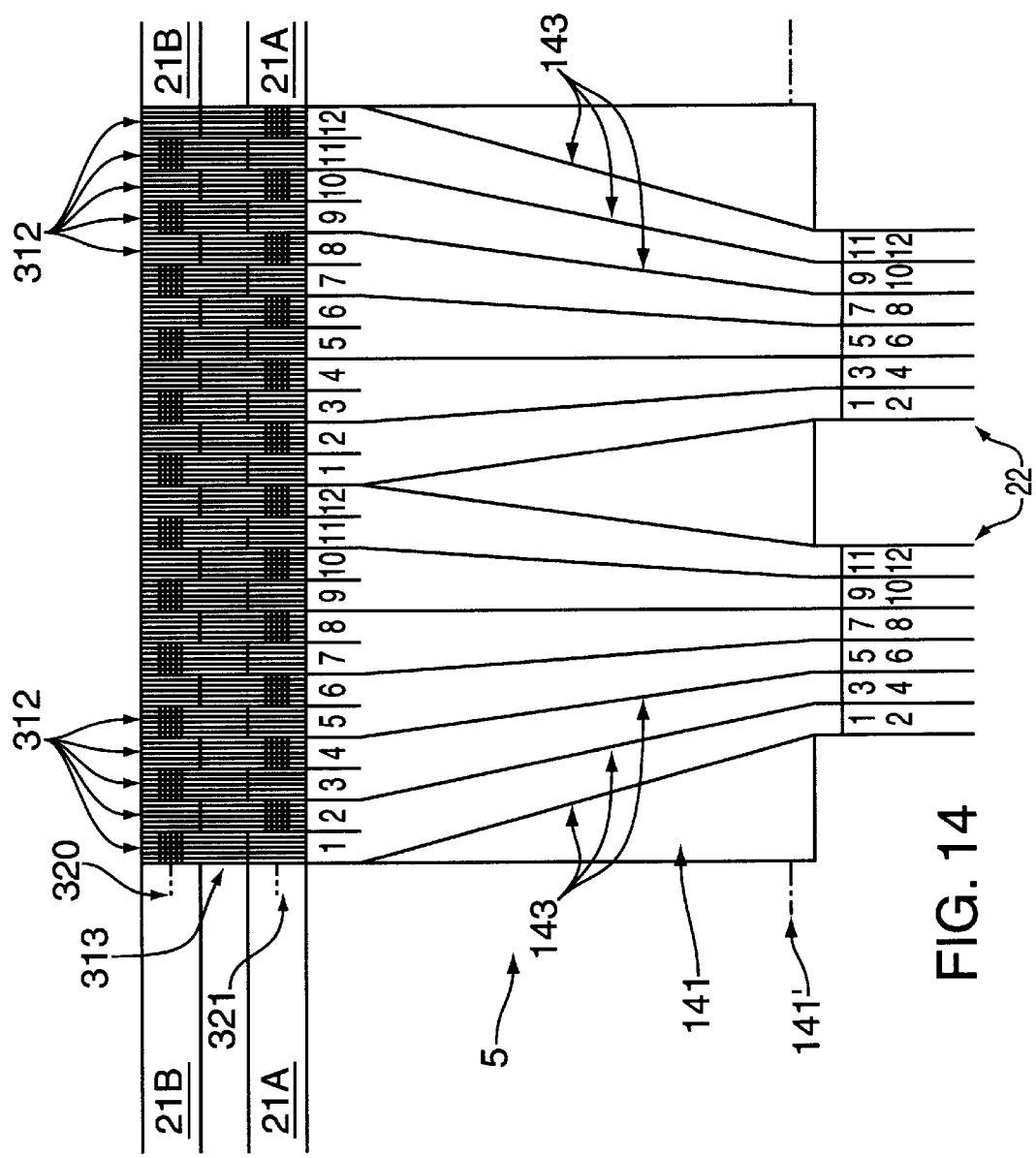
FIG. 14 is a schematic, partially cross-sectional view of a transfer of the present invention used with the embodiment of FIG. 13.

Although the preferred embodiment uses the transfer of FIG. 5, it is to be understood that any known transfer could be used with the present invention, including that shown in U.S. Pat. No. 5,167,317 to van der Schoot et al.; the substance of that patent is incorporated by reference. FIGS. 12 and 13 show examples of the transfers described in that patent used in the present invention. In FIG. 12, one of the conveyors 21A or 21B may drop upon a transfer, preferably a brush 135A, 135B which rotates about a shaft 136A, 136B, which brush 135A, 135B may be divided into channels or rows by rotatable disks 137A, 137B or, alternatively, by raised bristles. In the embodiment of FIG. 12, some of the eggs may drop on a guide 308 to be thereafter guided to the brush 135A, 135B. The eggs may be removed from the brush by a plate or comb 310 mounted on a support 311, which feeds the eggs to the conveyor 141. FIG. 13 shows an alternative transfer formed as a brush conveyor 313 with bristle sections 312. The conveyor 313 is driven around rods or spindles 320, 321 to move in the direction shown by arrow C. The conveyor 313 may be divided along its width (i.e., into the drawing paper) into channels or rows by divider elements or by raised bristles. As shown in FIG. 13, the conveyor 313 could be configured to extend below both conveyors 21A, 21B (shown divided by a dashed line), such that the conveyor 313 also extends along the entire length and width of both conveyors 21A, 21B at a particular packing station. In the embodiment of FIG. 13, eggs would be ejected in alternate odd and even rows or channels of the conveyor 313 to ensure that eggs from, e.g., conveyor 21A do not fall on eggs ejected from conveyor 21B which are traveling under conveyor 21A on conveyor 313. FIG. 14 shows a view of the transfer used with the embodiment of FIG. 13. As can be seen in FIG. 14, the transfer is formed of a single conveyor with bristle sections 312 which are aligned with rows 1–12. As discussed above, the conveyor sections 312 may be divided using a divider or raised bristles, to thereby form channels or rows aligned with rows 1–12.

In operation, eggs are carried by the prongs 95 until they reach a transfer of the egg processing system 1, 1' or 1". When the eggs arrive above the appropriate station, solenoids 123 are selectively actuated, as described in U.S. Pat. No. 4,519,494, so as to eject only those eggs having physical characteristics appropriate for the associated transfer. Plungers 124 of solenoids 123 engage the upper T-sections 102 of extension bars 100 and cause the bars to rotate about a shaft, thereby ejecting the eggs from the prongs 95. When plungers 124 are moved into the path of the prongs 95 and engage T-sections 102 of the extension bars, the rotation of the bars causes prongs 95 to pivot outwardly with respect to one another due to the force of springs which urge prongs toward their open position. The eggs are then ejected, drop downwardly as shown in FIG. 5, and are caught by the cylinders 135A, 135B which slow the speed at which the eggs are falling and gently move the eggs away from prongs 95 to support members 138A, 138B and into the channels or rows of conveyor 141, which operates at a speed which is substantially less than that of the conveyors 21A, 21B.

FIG. 6 is a schematic, partially cross-sectional representation of transfers leading to packing stations 22 of the present invention. conveyors 21A 21B (which may travel in the same direction—as in the embodiments of FIGS. 1 and 3—or in different directions—as in the embodiment of FIG. 2) traverse the conveyors 5 leading to packing stations 22. Located below the conveyors 21A, 21B may be a series of transfers, preferably in the form of brush cylinders 135A, 135B, respectively, which are rotated by shafts 136A, 136B. As can be seen in FIG. 6, a series of stationary guide members 142 create a series of rows 1, 2, 3, 4, . . . , 12 on conveyor belt 141. The "odd" rows 1, 3, 5, . . . , 11 receive eggs ejected from first conveyor 21A, while the "even" rows 2, 4, 6, . . . , 12 receive eggs ejected from first conveyor 21B. As used herein, the "odd" rows are the first and sequent alternating rows, and the "even" rows are the second and sequent alternating rows into which eggs are ejected from conveyors 21A, 21B. Brushes 135A are configured so that they are located immediately above odd rows 1, 3, 5, . . . , 11, while brushes 135B are located immediately above even rows 2, 4, 6, . . . , 12. Downstream of brushes 135A, adjacent odd and even rows 1 and 2, 3 and 4, 5 and 6, . . . , 11 and 12, each merge into single rows, which single rows are divided by stationary guide members 143. Stationary guide members 143, like stationary guide members 142, may be disposed over the conveyor belt 141 in close proximity thereto and may have an inverted, V-shaped profile (i.e., are upwardly convex). Thus, as illustrated at the bottom of FIG. 6, each row which feeds into packers 22 receives eggs from two of the rows into which eggs are ejected from conveyors 21A, 21B, i.e., one row in packer 22 receives eggs from odd row 1 and even row 2, one row in packer 22 receives eggs from odd row 3 and even row 4, etc. It will therefore be understood that the rows feeding into packers 22 are of a number (i.e., in FIG. 6, twelve) less than the number of rows (i.e., in FIG. 6, twenty-four) into which eggs are ejected from the conveyors 21A and 21B. It will be further understood that the conveyor 141 will preferably operate at a speed which is slower than the speed of the conveyors 21A, 21B.

Although FIG. 6 shows eggs being fed to packers 22, it is to be understood that the present invention contemplates feeding eggs into any other arrangement. For example, eggs could be fed by conveyor 141 into an egg breaking machine, into a hand packing station, into a further conveyor for recirculation or discarding of eggs, or even to an incubator.

Figure 7:
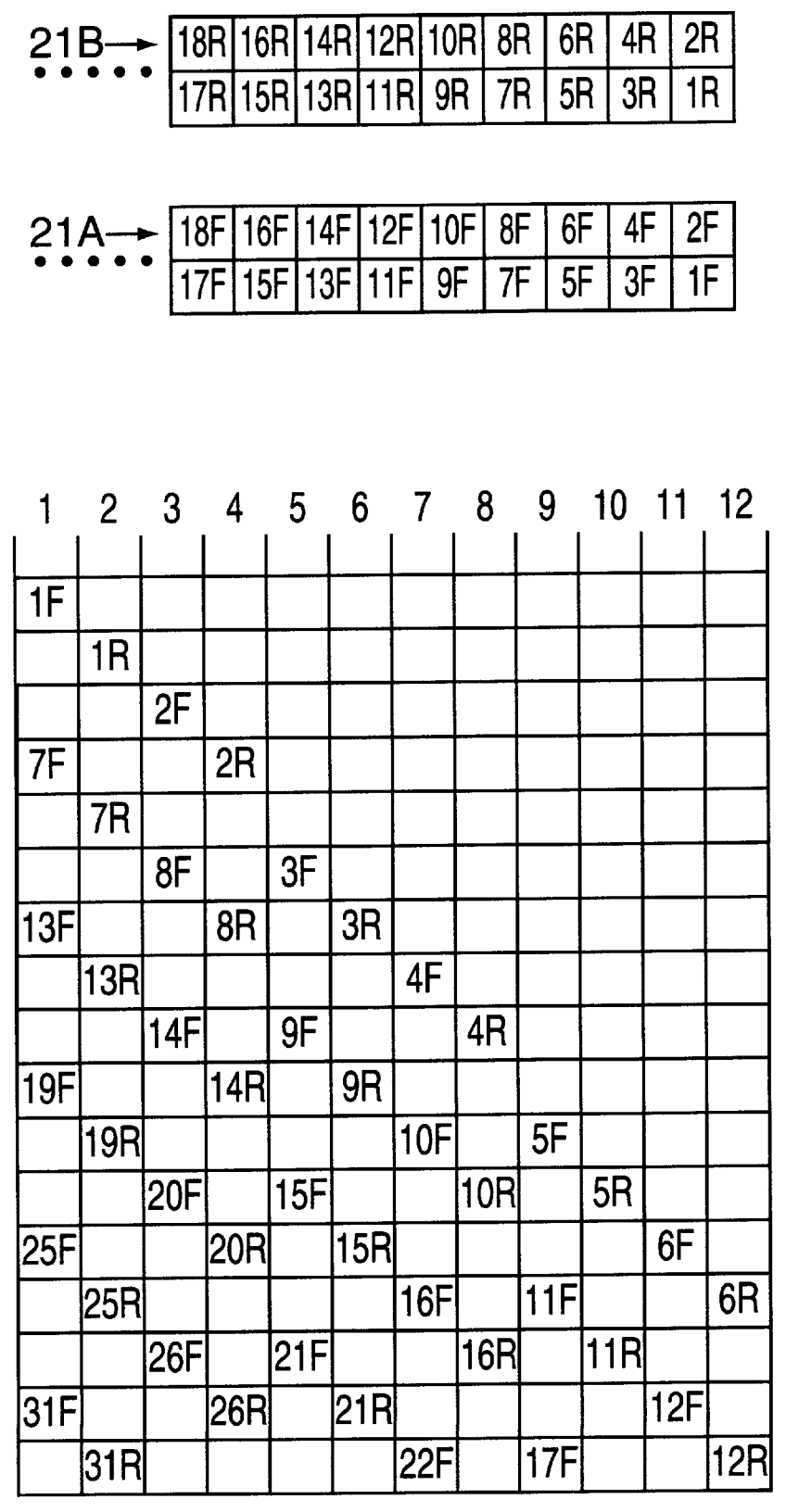

FIG. 7 shows schematically a eject sequence or pattern which may be used with the embodiment of FIG. 6. As shown in FIG. 7, ejection of the eggs from the prongs 95 on conveyors 21A, 21B may be selectively controlled so as to eject the eggs successively into the channels or rows formed by disks 137 in cylinders 135A and 135B and by members 142 above conveyor 141, beginning with the first such channel or row reached by the eggs as they are conveyed by prongs 95 to the transfer. FIG. 7 illustrates one preferred pattern used for ejecting eggs from conveyors 21A and 21B, when those conveyors 21A, 21B carry two rows of eggs. The positions of eggs on conveyors 21A, 21B are illustrated at the top of FIG. 7 using the designations 1F, 2F, 3F, . . . , etc. for those eggs on the first (front) conveyor 21A, while the designations 1R, 2R, 3R, . . . , etc. are used for those eggs on the second (rear) conveyor 21B. FIG. 7 illustrates a ejecting pattern used to distribute eggs across six rows separated by dividers 143, used to feed six rows of a packer 22; it being understood that this pattern could be modified and adapted by persons of ordinary skill in the art for use with packers which are five, four or any other number of rows wide. By ejecting the eggs from the prongs 95 into the cylinders 135A and 135B as shown, i.e., over the entire axial length of the area of the transfer available for receiving the eggs, an even distribution of the eggs is obtained in the channels or rows formed by guide members 142 and 143 above conveyor 141. Thus, as will be seen in FIG. 7, egg 1F will first be ejected into row 1, followed by egg 1R in row 2, followed by egg 2F in row 3, followed by a simultaneous ejection of egg 7F in row 1 and egg 2R in row 4. The ejection pattern continues as illustrated in FIG. 7, ultimately resulting in even distribution of eggs across the packer 22 associated with those rows, and also resulting in little or no interference between eggs, thereby reducing the possibility of egg collisions during ejection and subsequent conveyance which could result in damaged eggs.

FIG. 8 illustrates a ejecting pattern for a six-wide packer 22 wherein the conveyors 21A, 21B are both three-wide. It is to be understood that the ejecting patterns as shown in FIGS. 7 and 8 could readily be adapted by those skilled in the art to accommodate four-wide conveyors 21A, 21B or conveyors of any other width, and four, five and/or six wide packers.

Both FIGS. 7 and 8 represent a condition in which all of the eggs on the conveyors 21A and 21B are to be dropped at the illustrated transfer. It is to be understood that FIGS. 7 and 8 are for representational and illustrative purposes, and that in actual use the eggs to be distributed at one transfer will normally be distributed among eggs and possibly empty prongs 95 which do not eject one particular transfer.

Generally speaking, all eggs which have been determined to have identical or similar physical characteristics are preferably ejected in the channels or rows at one portion of a transfer in the sequences illustrated in FIGS. 7 or 8 (or readily contemplated alternatives thereof for four, five or other width packers and/or four-wide conveyors 21A, 21B), for the embodiment of FIG. 6.

Figure 9:
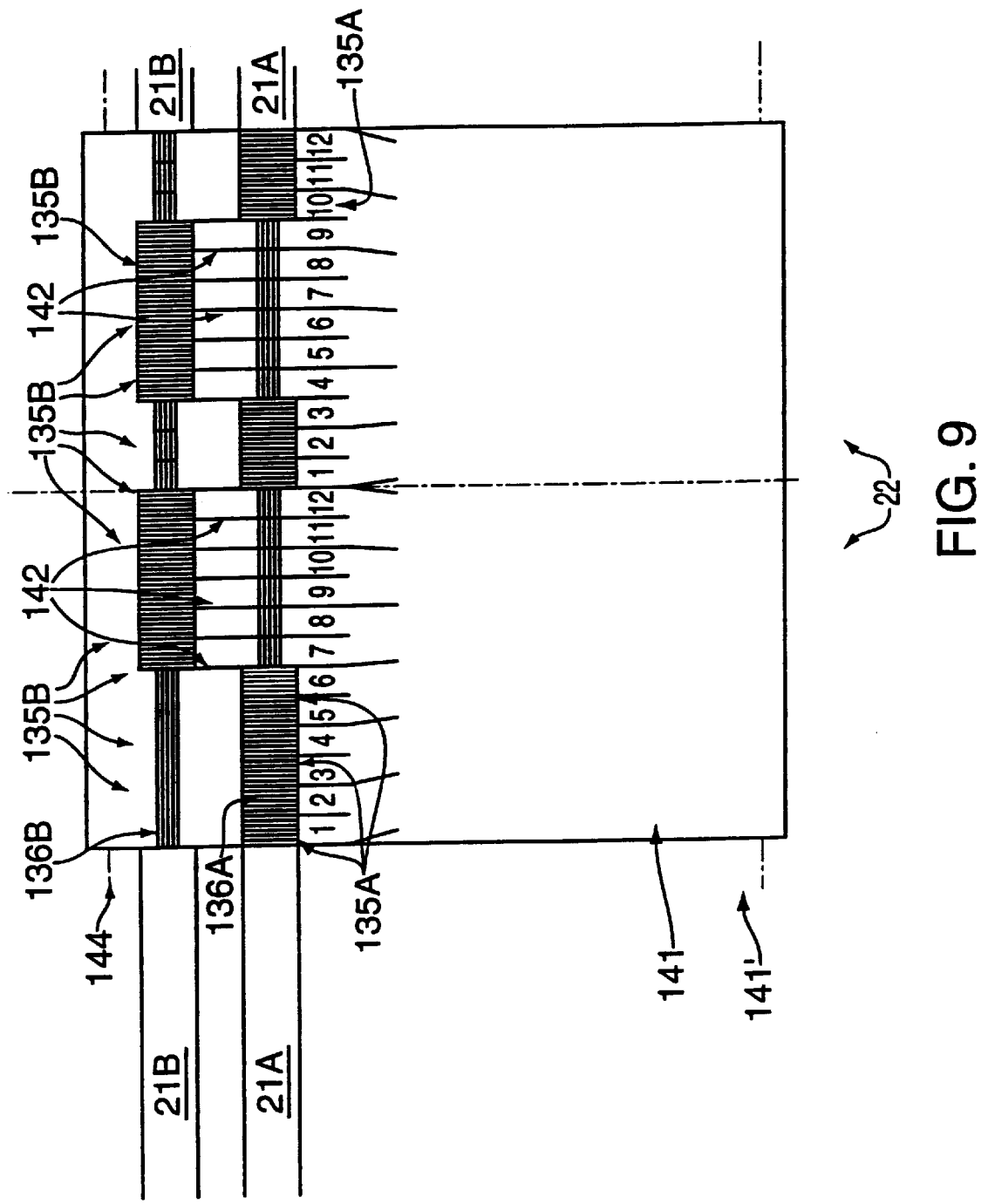
FIG. 9 is a schematic, partially cross-sectional view of a second (left-hand side) and third (right-hand side) embodiment of the transfer of the present invention.

FIG. 9 shows alternative configurations of the transfers, with the portion to the left of the dashed line being a second configuration, and the portion to the right of the dashed line being a third configuration. It is to be understood that these configurations need not be used together as shown, and that the configurations would preferably be duplicated at a transfer feeding two packers 22.

The embodiment on the left hand side of FIG. 9 ejects eggs from front conveyor 21A into rows 1, 2, 3, 4, 5 and 6, while eggs from rear conveyor 21B are ejected into rows 7, 8, 9, 10, 11 and 12. In the embodiment on the right hand side of FIG. 9, the front conveyor 21A ejects eggs into rows 1, 2, 3, 10, 11 and 12, while eggs from rear conveyor 21B are ejected into rows 4–9.

Figure 10:
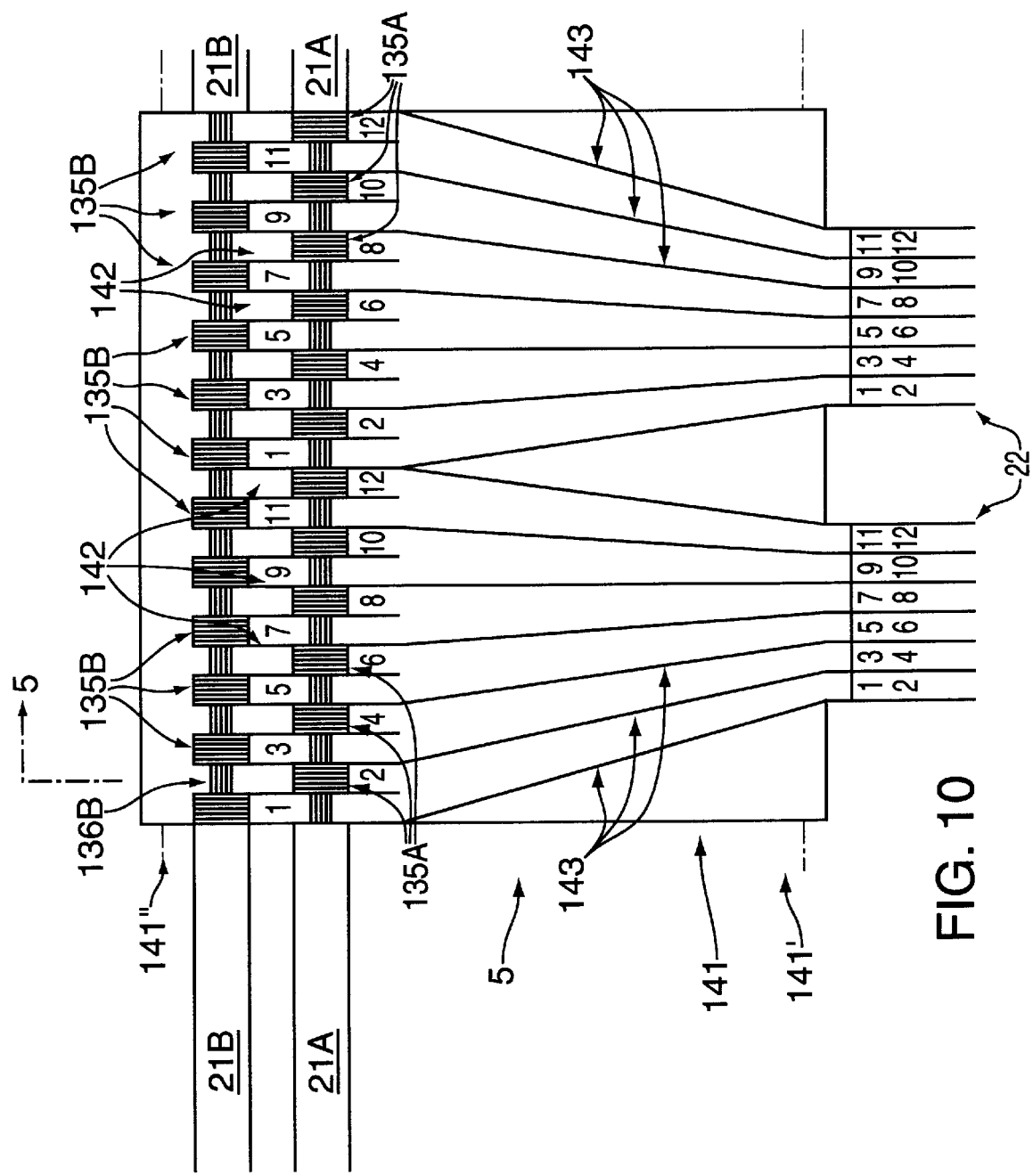
FIG. 10 is a schematic, partially cross-sectional view of a fourth embodiment of the transfer of the present invention.
Figure 11:
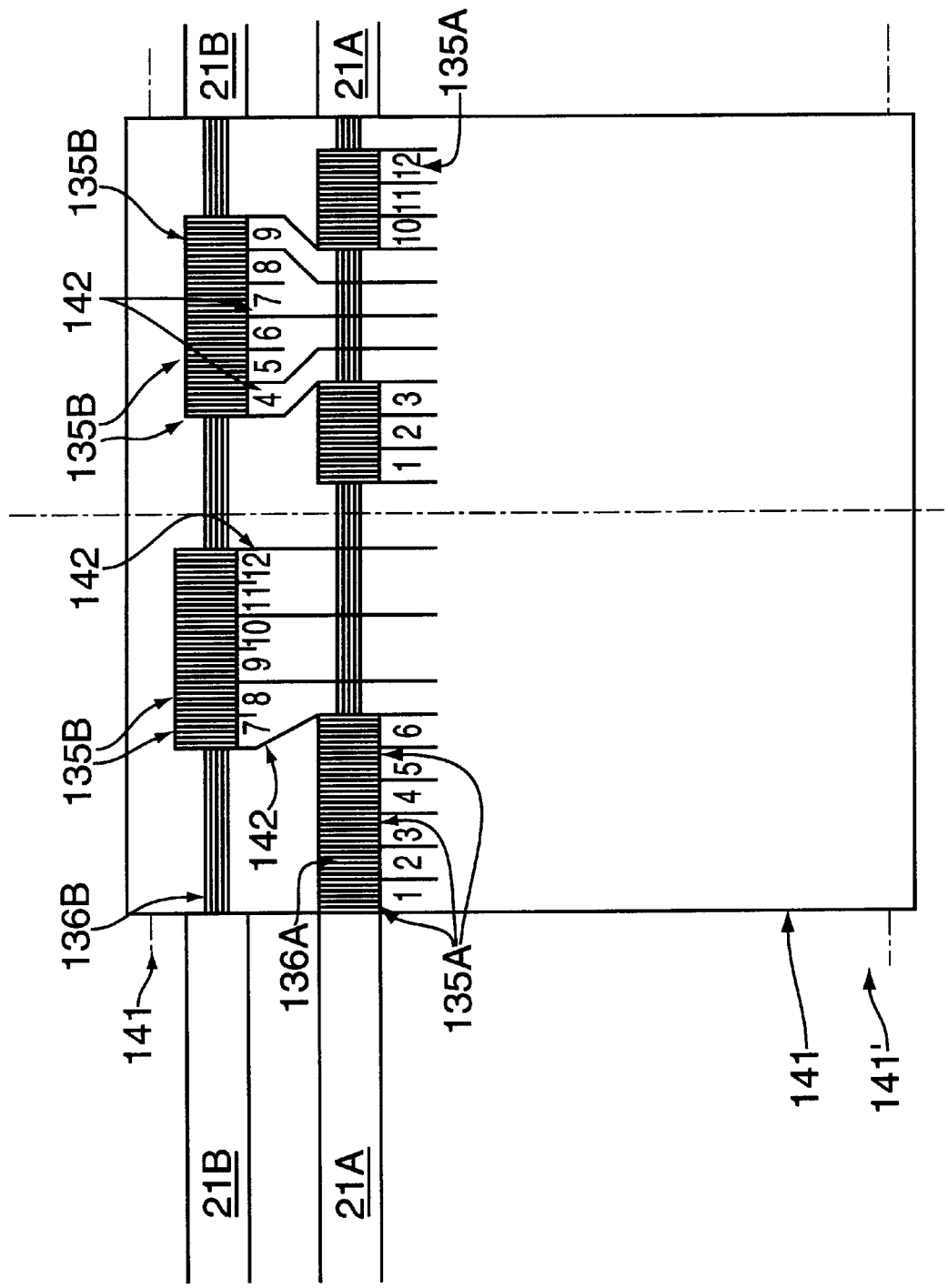
FIG. 11 is a schematic, partially cross-sectional view of a fifth (left-hand side) and sixth (right-hand side) embodiment of the transfer of the present invention.

FIG. 11 shows the embodiments of FIG. 9 configured in a manner such that they can reduce the overall length of the conveyor assembly 21. As can be seen on both the left- and right-hand sides of FIG. 11, the brushes 135A and 135B are slightly staggered or offset (i.e., they overlap along the length of the conveyor assembly 21), and the channels or rows into which eggs from the rear conveyor 21B are ejected merge together (at least in part) prior to the eggs passing under the front conveyor 21A. This staggering or offsetting allows the overall length of the transfers to be reduced, while achieving the same degree of packing capacity as the embodiments of FIGS. 6, 9 and 10.

FIG. 10 shows an alternative embodiment to the embodiment of FIG. 6, wherein the rear conveyor 21B ejects into the odd rows 1, 3, . . . , and the front conveyor 21A ejects into the even rows 2, 4, . . . . As will be understood, the ejecting patterns of FIGS. 7 and 8 would be adapted accordingly.

It is to be understood that the embodiments of FIGS. 9 and 11 also contemplate the ejecting patterns (and transfers) to be reversed, so that the rear conveyor 21B ejects into rows 1–6 and front conveyor ejects into rows 7–12 (left-hand embodiment), or the the rear conveyor 21B ejects into rows 1–3, 10–12 and front conveyor ejects into rows 4–9 (right-hand embodiment).

The present invention contemplates a number of different variations on the above-described preferred embodiments. For example, and as discussed above, the packers could be four, five or six-wide configurations (or any other known configuration for packing eggs in an egg holder or tray, and the conveyors could alternatively be two, three or four rows wide. Furthermore, although two conveyors are shown in the drawing figures, it is to be understood that more than two conveyors could be used in the present invention, with each conveyor being configured in a manner consistent with the disclosed embodiments. In addition, it is to be understood that although two conveyors are shown, a single conveyor with multiple rows of the same number as the two conveyors combined could alternatively be used It is to be understood that the above description is only of one preferred embodiment, and that the scope of the invention is to be measured by the claims as set forth below.

What is claimed is:

1. A method of conveying eggs comprising:
   conveying a first plurality of the eggs in a first plurality of rows;
   conveying a second plurality of the eggs in a second plurality of rows, the second plurality of rows being parallel to the first plurality of rows;
   providing a first transfer from the first plurality of rows and a second transfer from the second plurality of rows, the first transfer and the second transfer including a third plurality of rows;
   ejecting at least some of the eggs from the first plurality of rows to the first transfer;
   ejecting at least some of the eggs from the second plurality of rows to the second transfer;
   merging eggs from the third plurality of rows into at least one row of a number less than the third plurality of rows; and conveying the ejected eggs away from the first and second plurality of rows.

2. The method of claim 1, wherein:
the third plurality of rows includes alternating odd and even rows; and
wherein the merging includes merging each odd row with one of the even rows.

3. The method of claim 2, wherein:
ejecting eggs from the first plurality of rows includes ejecting eggs into the odd rows; and
wherein ejecting eggs from the second plurality of rows includes ejecting eggs into the even rows.

4. The method of claim 1, wherein:
the first and second transfers are offset along a direction of movement of the first and second plurality of rows.

5. The method of claim 1, wherein:
the first plurality of rows and the second plurality of rows are conveyed in the same direction.

6. The method of claim 1, wherein:
the first plurality of rows and the second plurality of rows are conveyed in opposite directions.

7. The method of claim 1, wherein:
conveying the first plurality of eggs includes conveying the first plurality of eggs on a first conveyor; and wherein conveying the second plurality of eggs includes conveying the second plurality of eggs on a second conveyor.

8. The method of claim 1, wherein:
conveying the first plurality of eggs and conveying the second plurality of eggs includes conveying the first and second plurality of eggs on a single conveyor.

9. The method of claim 1, wherein:
conveying the first plurality of the eggs in a first plurality of rows includes conveying the first plurality of eggs at a speed which is greater than a speed at which eggs are conveyed away from the first and second transfers.

10. The method of claim 1, further comprising:
packing the ejected eggs.

11. The method of claim 1, further comprising:
breaking the ejected eggs.

12. An apparatus for conveying eggs comprising:
a conveyor assembly, the conveyor assembly including a first plurality of rows and a second plurality of rows, the second plurality of rows being parallel to the first plurality of rows, the conveyor assembly conveying the eggs in the first and second plurality of rows, the conveyor assembly further including egg conveying and ejecting elements, the egg conveying and ejecting elements ejecting eggs from the conveyor assembly;
first and second transfers, the first and second transfers receiving eggs ejected from the conveyor assembly by the egg ejecting elements;
the first transfer and the second transfer including a third plurality of rows, the third plurality of rows merging into at least one row, the at least one row being of a number less than the third plurality of rows.

13. The apparatus of claim 12, wherein:
the third plurality of rows includes alternating odd and even rows; and
each odd row merging with one of the even rows.

14. The apparatus of claim 13, wherein:
the ejecting elements eject eggs from the first plurality of rows into the odd rows; and
the ejecting elements eject eggs from the second plurality of rows into the even rows.

15. The apparatus of claim 12, wherein:
the first and second transfers are offset along a length of the first and second plurality of rows.

16. The apparatus of claim 12, wherein:
the conveyor assembly includes a first conveyor and a second conveyor; the first conveyor including the first plurality of rows and the second conveyor including the second plurality of rows.

17. The apparatus of claim 16, wherein:
the first conveyor moves in the same direction as the second conveyor.

18. The apparatus of claim 16, wherein:
the first conveyor moves in an opposite direction of the second conveyor.

19. The apparatus of claim 12, wherein:
the conveyor assembly includes a single conveyor; the single conveyor including the first plurality of rows and the second plurality of rows.

20. A method of conveying eggs comprising:
conveying a first plurality of the eggs in a first plurality of rows;
conveying a second plurality of the eggs in a second plurality of rows, the second plurality of rows being parallel to the first plurality of rows;
providing at least one transfer, the at least one transfer including a third plurality of rows;
ejecting selected ones of the eggs from the first plurality of rows into a first group of the third plurality of rows;
ejecting selected ones of the eggs from the second plurality of rows into a second group of the third plurality of rows different from the first group of the third plurality of rows; and
merging the first and second groups of the third plurality of rows into at least one row of a number less than the third plurality of rows.

21. The method of claim 20, wherein:
the third plurality of rows includes alternating odd and even rows and wherein the first group of the third plurality of rows are the odd rows and the second group of the third plurality of rows are the even rows; and
wherein merging the third plurality of rows includes merging each odd row with one of the even rows.

22. The method of claim 20, wherein:
the first and second plurality of rows are conveyed in the same direction.

23. The method of claim 20, wherein:
the first and second plurality of rows are conveyed in opposite directions.

24. The method of claim 20, wherein:
conveying the first plurality of eggs includes conveying the first plurality of eggs on a first conveyor; and wherein conveying the second plurality of eggs includes conveying the second plurality of eggs on a second conveyor.

25. The method of claim 20, wherein:
conveying the first plurality of eggs and conveying the second plurality of eggs includes conveying the first and second plurality of eggs on a single conveyor.

26. The method of claim 20, further comprising:
packing the ejected eggs.

27. The method of claim 20, further comprising:
breaking the ejected eggs.

28. An apparatus for conveying eggs comprising:
a conveyor assembly, the conveyor assembly including a first plurality of rows and a second plurality of rows, the second plurality of rows being parallel to the first plurality of rows, the conveyor assembly conveying the eggs in the first and second plurality of rows, the conveyor assembly further including egg conveying and ejecting elements, the egg conveying and ejecting elements ejecting eggs from the conveyor assembly;

at least one transfer, the at least one transfer receiving eggs ejected from the conveyor by the egg ejecting elements;

the transfer including a third plurality of rows, the third plurality of rows merging into at least one row, the at least one row being of a number less than the third plurality of rows.

29. The apparatus of claim 28, wherein:

the third plurality of rows includes alternating odd and even rows; and each odd row merges with one of the even rows.

30. The apparatus of claim 29, wherein:

the ejecting elements eject eggs from the first plurality of rows into the odd rows; and the ejecting elements eject eggs from the second plurality of rows into the even rows.

31. The apparatus of claim 28, wherein:

the conveyor assembly includes a first conveyor and a second conveyor; the first conveyor including the first plurality of rows and the second conveyor including the second plurality of rows.

32. The apparatus of claim 31, wherein:

the first conveyor moves in the same direction as the second conveyor.

33. The apparatus of claim 31, wherein:

the first conveyor moves in an opposite direction of the second conveyor.

34. The apparatus of claim 28, wherein:

the conveyor assembly includes a single conveyor; the single conveyor including the first plurality of rows and the second plurality of rows.

35. The method of claim 1, wherein:

a speed of the first transfer is independent of a speed of the second transfer.

36. An apparatus for cleaning, inspecting, conveying and grading eggs comprising:

a first conveyor and a second conveyor;

a first washer and a second washer, the first conveyor feeding eggs into the first washer and the second conveyor feeding eggs into the second washer;

a first candler and a second candler, the first conveyor feeding eggs to the first candler and the second conveyor feeding eggs to the second candler;

a first weighing station and a second weighing station, the first conveyor feeding eggs to the first weighing station and the second conveyor feeding eggs to the second weighing station;

a transfer mechanism including a first section and a second section, at least a portion of the first section being set back from the second section, the first section feeding eggs from the first weighing station and the second section feeding eggs from the second weighing station;

a conveyor assembly, the conveyor assembly including a first plurality of rows and a second plurality of rows, the second plurality of rows being parallel to the first plurality of rows, the first section transferring eggs to the first plurality of rows and the second section transferring eggs to the second plurality of rows, the conveyor assembly conveying the eggs in the first and second plurality of rows, the conveyor assembly further including egg conveying and ejecting elements, the egg conveying and ejecting elements ejecting eggs from the conveyor assembly;

at least one receiving brush, the at least one receiving brush receiving eggs ejected from the conveyor assembly; and at least one packer, the at least one packer packing eggs received by the at least one receiving brush.

37. The apparatus of claim 36, further comprising:

a comb, the comb removing eggs from the at least one receiving brush.

38. The apparatus of claim 36, wherein:

the conveyor assembly includes a single conveyor; the single conveyor including the first plurality of rows and the second plurality of rows.

39. The apparatus of claim 36, further comprising:

a plurality of receiving brushes, each receiving brush receiving eggs ejected from the conveyor assembly of a particular grade; and a plurality of packers, each packer packing eggs received by one of the receiving brushes, each packer packing eggs of a particular grade.

* * * * *